INVENTOR
WILLIAM V. BAUER
BY *Marn & Jangarathis*
ATTORNEYS

_United States Patent Office_

3,298,932
Patented Jan. 17, 1967

3,298,932
DISTILLATION OF A SOLUTE-SOLVENT MIXTURE IN SUCCESSIVELY REDUCED PRESSURE STAGES WHILE IN DIRECT CONTACT AND CONCURRENT FLOW WITH A HEAT TRANSFER MEDIUM
William V. Bauer, Scarsdale, N.Y., assignor to The Lummus Company, New York, N.Y., a corporation of Delaware
Filed Apr. 25, 1962, Ser. No. 190,170
18 Claims. (Cl. 203—11)

The present invention relates to an improved process and apparatus for the separation of a solute from a solvent-solute by an improved heat-exchanger technique and is, more particularly, concerned with a multiple-effect vapor compression system utilizing an intermediate heat-transfer fluid, and with the demineralization of sea water.

Various evaporative techniques have been previously employed to separate water from brines. Because evaporation of water consumes a very large amount of energy (about 100 B.t.u./pound), many improvements have been made in the basic process of distillation. One of these improvements is the multiple-effect system. In multiple-effect systems, the brine is first evaporated at a relatively high pressure and temperature with the resulting water vapor being condensed in a second effect evaporator. The liquid effluent from the first effect is evaporated at a lower pressure and temperature in the second effect by the condensation of the water vapor removed from the first effect. A sufficient temperature difference is maintained between the condensing vapor and the boiling liquid to achieve economically practical rates of heat transfer.

A large number of effects can be used in the permissible temperature range with the upper temperature being usually limited by scaling problems, and the lower temperature being limited by economic factors and by the lowest temperature at which the water vapor generated at the lowest pressure can be condensed with available cooling water.

In another distillation process, evaporation is conducted in one stage, but instead of supplying heat for evaporation from externally generated high-pressure stream, the water vapor generated in the evaporator is compressed to a sufficiently high pressure so that it can be condensed in the evaporator heating tubes at a temperature higher than the boiling point of the liquid. This process is known as vapor-compression.

Several technical factors affect the design and economy of separation plants using a multiple-effect system or a vapor-compression system. For instance, a vapor pressure lowering (boiling point elevation) factor must be considered. Dissolved materials lower the vapor pressure of a solution below that of the pure solvent at the temperature in question.

In multiple-effect evaporation, the external energy requirement is inversely related to the number of effects, thus, if the latent heat of evaporation of water were constant at 1000 B.t.u. per pound, a five-effect evaporator would require an energy input of 200 B.t.u. per pound of product water and a 12-effect evaporator would require only 83 B.t.u. per pound. The number of operable effects is equal to the temperature range between the permissible temperature limits, about 250° F. to about 120° F., divided by the smallest practical temperature difference between stages, about 10° F. This difference takes into account the boiling-point elevation factor and the minimum economical ΔT across the evaporator tubes.

In a vapor-compression process, the required compression of the water vapor is a function of a vapor-pressure lowering due to dissolved salts, plus line pressure losses, plus the pressure increment required to achieve the minimum economical ΔT across the evaporator heat-transfer surface. Typically, vapor compression for separating water from sea water, would require a compression ratio of 1.3, equivalent to about 20 B.t.u. per pound of product water. However, compression requires the use of mechanical equipment, such as a compressor and steam turbine or other driver, with a combined efficiency of perhaps 25%. Hence, the energy consumption must approach 80 B.t.u. per pound of product which is comparable to that required in a 12-effect multiple-effect evaporator. A serious drawback in vapor compression is the need to compress very large volumes of water vapor. The cost of machinery to handle such large volumes is considerable.

A major obstacle to economical separation in any process for the production of a purified water is scaling and, to a lesser extent, the corrosiveness of sea water, brackish water, and other solutions of commercial significance. Scaling, in particular, limits the upper temperature and, therefore, the number of effects that can be used and requires labor-consuming and costly-scale control methods.

Various attempts have been made to improve separation processes in light of the above factors. Gilliland, U.S. Patent 2,976,224, for example, teaches the use of an immiscible heat-transfer liquid, such as molten paraffin wax in a brine purification process. The molten wax is contacted with the brine liquor at its boiling point, thereby evaporating water from the brine liquor and causing partial crystallization of the wax, without the need for metallic heat-transfer surfaces. Thus, the scaling problem is minimized. The partly crystallized heat-transfer medium can be remelted in a separate step by various convenient means.

The Gilliland process, however, has technical and practical disadvantages. It is critical for reasons of thermodynamic efficiency to conduct evaporation (and condensation) with the lowest possible temperature difference. Consequently, it is necessary to conduct evaporation at a fixed temperature (unless heating media at various temperatures are available, so arranged as to drive heat to the evaporating liquid at small temperature differences throughout). To achieve this end, it is necessary to inject the brine into the molten wax close to the upper surface of the wax to avoid excessive hydraulic static head, which would cause: (1) evaporation of brine at various pressures and temperatures; and (2) lowering of the pressure, and hence thermodynamic degradation of the water vapor generated at the lower elevation, and thus higher pressure.

To satisfy this requirement, it is necessary to use as brine evaporators, shallow vessels with perhaps one foot liquid level above the brine injection level, and with a very large surface area to accommodate the heat-transfer and steam disengagement requirements. For example, if we assume:

Daily water make=1 MM gallon=347,000 lb./hr.
Heat-transfer medium=wax, M.P.=200° F.
   Wax to be completely molten at the vaporizer inlet
   and 10% crystallized at outlet Latent heat of fusion of wax=100 B.t.u./lb.
the required circulation of wax is:

$$347{,}000 \times \frac{1000 \text{ B.t.u./lb. (water evaporation)}}{10 \text{ B.t.u./lb. (wax solidification)}} = 34{,}700{,}000 \text{ lb./hr.}$$

Assuming a volumetric heat transfer coefficient of 6000 B.t.u./hr. ft.$^3$ °F. and a $\Delta T$ of 4° F., the volume required in the vaporization zone is $$(347 \times 10^6)/(6000 \times 4) = 14{,}450 \text{ ft.}^3$$

For a liquid depth of one foot, therefore, a horizontal area of 14,450 ft.$^2$ is required for the evaporator. A shallow vessel of such dimensions is very expensive to construct and involves difficult engineering problems to insure uniform brine injection, uniform molten wax flow, etc. Because of the large circulation of wax, bulky and expensive disengaging vessels, or phase separators, are required to free the wax of brine droplets, if the wax is to be remelted by direct steam condensation. There is also a possibility that freezing wax particles may occlude brine.

The process of the present application overcomes the above disadvantages in the known processes and achieves a flexible evaporation-separation method applicable to fresh water recovery or to other solvent-solute recovery problems.

In the process according to the present application, evaporation of the solvent and condensation of the solvent vapor is effected by heat transfer to and from an intermediate liquid, conducted through a series of stages at successively lower temperatures and pressure. These stages may be advantageously stacked in a vertical cylindrical vessel.

It is, therefore, an object of the present invention to provide an improved process for the separation of a solvent from a solution.

It is a further object of the present invention to provide an improved direct heat-exchange technique utilizing a multiple-effect evaporation system for the separation of a solvent from a solution.

Another object of the present invention is to provide an improved method for separating a solvent from a solution wherein a heat-exchange liquid which is substantially insoluble in the solvent and solute is utilized in successive stages to effect the separation.

Other objects and advantages of the present invention will become apparent from the following detailed description, particularly when taken in connection with the accompanying drawings.

In the drawings, wherein like numerals designate like parts throughout the same, FIGURE 1 indicates generally a schematic flow diagram of the vapor compression, direct heat-exchange multiple-stage system according to the present invention;

Figure 1:
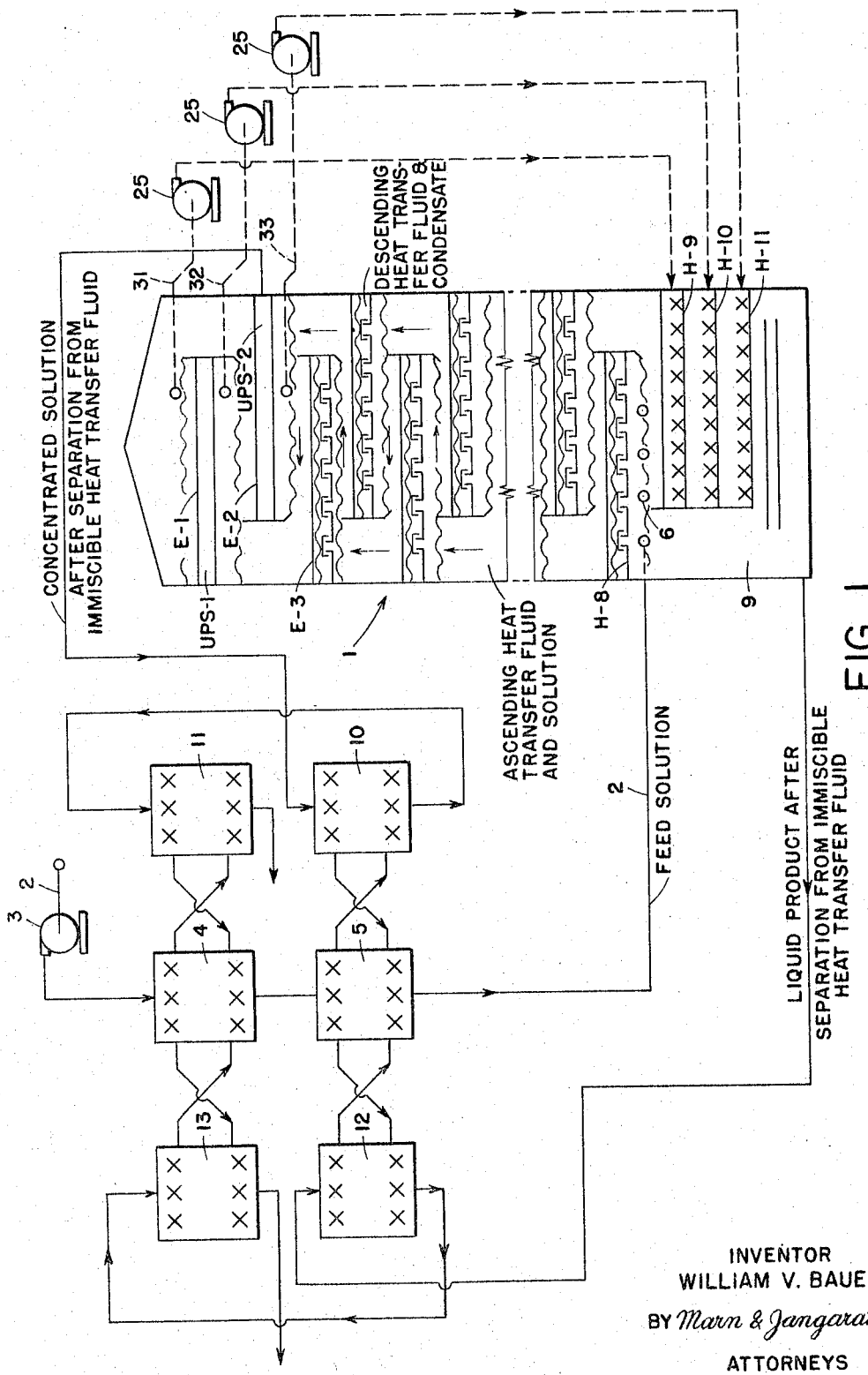

Referring now to FIGURE 1, the evaporator-condenser tower is generally designated by the numeral 1. A solvent-solute solution is fed through a conduit 2 by means of pump 3 from a suitable source (not shown). This feed solution is preheated in liquid heat-transfer spray columns 4 and 5 by the effluent streams including the product solvent and waste solute concentrate, as will be more fully explained hereinafter. The now heated feed solution is injected through suitable spargers 6 into the heat-transfer medium collected on the lower evaporative tray E–11, for example, of the tower 1. It may be desirable to introduce the feed solution into the heat-transfer medium on more than one evaporative tray, and in some instances on all of the evaporative trays depending on size and configuration of the tower.

The evaporator-condenser tower 1 is a vertical cylindrical tower having a series of vertically and alternately stacked evaporative and condensing trays. Upcomers and downcomers are provided for upflow of hot heat-transfer medium and downflow of cold heat-transfer medium, as required to interconnect the evaporative and condensing trays, respectively. The evaporative trays accommodate hot heat-transfer medium-feed suspension. The solvent evaporates from the feed solution abstracting heat from the heat-transfer medium. The concentrated solution and heat-transfer medium suspension is passed upwardly through the successive evaporative trays E of the tower. Additional evaporation takes place as the suspension flows across each evaporative tray. This sequence continues to the top evaporative tray E–1 after which the suspension is passed to the phase-separating zone UPS–1 for separation of the heat-transfer medium from the now concentrated feed solution. There is a slightly lower pressure on each successively higher evaporative tray E due to the decrease in hydrostatic head, and consequently, the boiling point of the solution on any given evaporative tray is lower than the boiling point of the solution on the evaporative tray below. The concentrated solution remaining after evaporation of solvent from the feed solution is separated from the heat-transfer medium in the phase separation zones and is utilized to preheat the feed solution as mentioned hereinabove.

The heat-transfer medium separated from the concentrated solution in the phase separation zone flows down the tower and is heated stepwise on the condensing trays, generally indicated as H, the temperature and pressure on any given condensing tray is lower than the temperature and pressure on the condensing tray immediately below in a manner similar to the evaporative trays as described above. Most of the condensing trays receive solvent vapors directly from the evaporative trays immediately therebelow. The solvent condensed on each condensing tray is passed with the heat-transfer medium through the column to the bottom phase separator generally indicated by numeral 9 located below the bottom condensing tray H–11. An external phase separator may be used if so desired. Phase separation of the hot heat-transfer medium and condensed solvent need not be complete and a small solvent carry over merely reduces the energy economy and throughput of the plant. The product solvent is removed from the phase separation zone 9 and may be used to preheat the feed stream 2.

The hot concentrated solution and the product solvent are passed in heat exchange relation to a circulating heat-exchange medium in the liquid heat-transfer spray columns 10 and 11 and 12 and 13 as indicated in FIGURE 1. This circulating heat-exchange medium is used to preheat the feed stream 2 in spray columns 4 and 5.

Figure 2:
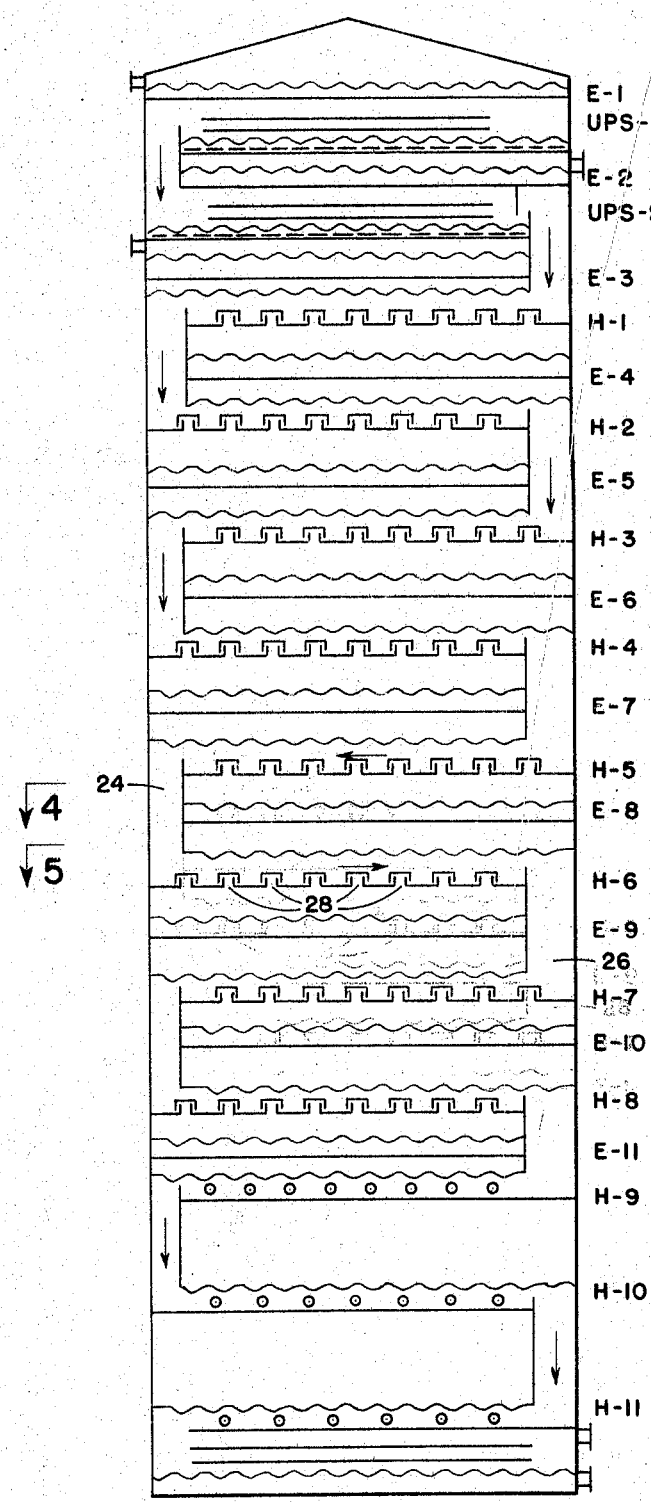
FIGURE 2 illustrates a detailed view of the evaporator-condenser tower according to the present invention.
Figure 3:
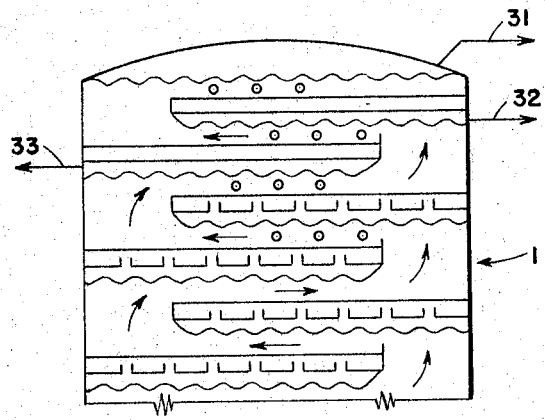
FIGURE 3 illustrates another view of the evaporator-condenser tower according to the present invention, taken on a plane 90° from the view of FIGURE 2.
Figure 4:
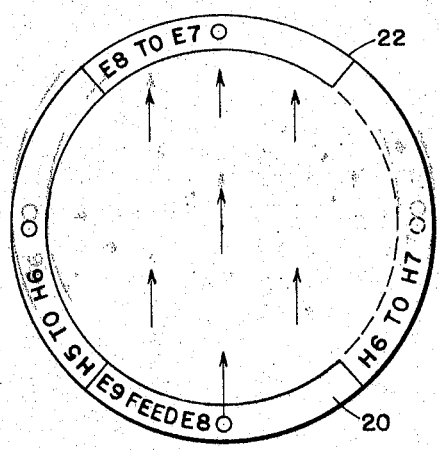
FIGURE 4 illustrates a top plan view of an evaporative tray taken along section line IV—IV of FIGURE 2.
Figure 5:
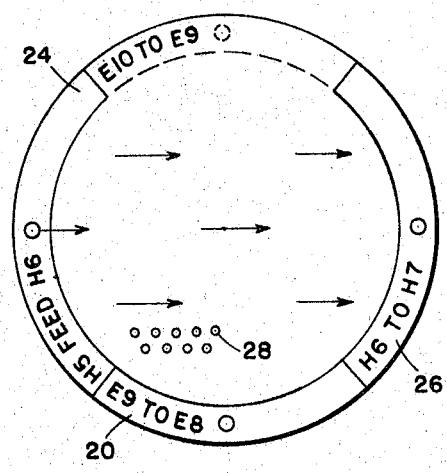
FIGURE 5 illustrates a top plan view of a condensing tray taken along section line V—V of FIGURE 2.

FIGURES 2 through 5 illustrate the evaporator-condenser 1 of FIGURE 1 in detail. FIGURE 2 illustrates evaporator-condensor 1 as a vertical cylindrical tower having a series of evaporative and condensing trays generally designated by the reference letters E and H, respectively. Upcomers are provided for upward passage of hot heat-transfer medium required to interconnect the evaporative trays, whereas downcomers are provided for downward passage of cold heat-transfer medium required to interconnect the condensing trays. FIGURES 4 and 5 illustrate top views of trays E–8 and H–6, respectively.

Referring to FIGURE 4, the evaporative tray E–8 is fed a hot heat-transfer medium and feed solution suspension through upcomer 20 from tray E–9. The solvent is evaporated by abstracting heat from the heat-transfer medium thereby concentrating the solution flowing across the tray. The suspension flowing across tray E-8 (as indicated by the arrows) is passed through upcomer 22 to the next evaporative tray, E-7 which is at a lower pressure than evaporative tray E-8. Because of the lower boiling point of the solution on evaporative tray E-7, a suitable $\Delta T$ driving force results which causes the evaporation of additional solvent as the suspension flows across evaporative tray E-7. This sequence continues to the top evaporative tray E-1. The solution passing upwardly from evaporative tray E-2 is caused to flow horizontally at the level of evaporative tray E-1 through 90° prior to passing over evaporative tray E-1. In this manner the downward flow of the heat-transfer medium is in a vertical plane which is essentially perpendicular to a vertical plane of the upwardly flowing suspension. From the upper phase separator UPS-1, the cool heat-transfer medium flows to the lower phase separator UPS-2 and then downwardly across condensing trays H-1 through H-11 whereby the heat-transfer medium is heated by condensation of the injected solvent vapor. The phase separation zones UPS-1 and UPS-2 can be equipped with horizontal plates, as shown, to increase separation efficiency. Suitable baffling and brine drains are provided. The phase separation zones are located between evaporative trays E-1 and E-2, and E-2 and E-3. The phase separation zones may also be located above evaporative tray E-1, or alternately provided in another vessel. If it is required to obtain very pure product solvent, additional separation devices such as centrifuges, etc., may be provided to remove solution droplets from the cool heat-transfer medium.

The heat-transfer medium is heated stepwise on the condensing trays by condensing vapor at a temperature slightly higher than the temperature range of the heat-transfer medium on the tray. Most of the condensing trays H-1 through H-8 receive solvent vapors directly from the evaporative tray directly below, i.e. E-4 through E-11 respectively. For this purpose the condensing trays may be advantageously constructed as sieve trays or bubble trays, for example.

The vapor generated on the upper evaporative trays E-1, E-2, and E-3 may not be utilized for directly reheating the heat-transfer medium since the dew point of the vapor is too low. This is a consequence of process inefficiencies, such as temperature-driving forces, pressure drops, liquid head, etc., and inescapable vapor pressure lowering of the solution due to dissolved solids. However, as in conventional vapor compression processes, the latent heat content of the vapor from these trays can be recovered by compression thereof to a pressure such that the condensation temperature will exceed the temperature to which the heat-transfer medium must be heated on the lower condensing trays. Accordingly, these vapors are removed through lines 31, 32, and 33, compressed in compressors 25 and injected into the heat-transfer medium on the lower condensing trays H-9, H-10 and H-11, respectively, such as by spargers.

The solvent condensed on each condensing tray may be drained from each tray by suitable arrangement of drains and weirs, not shown in the figures or be allowed to flow with the heat-transfer medium through the column to the bottom phase separator. Phase separation of the hot heat-transfer medium need not be complete, since a small solvent carry over merely reduces the energy economy and the throughput of the plant.

FIGURE 5 illustrates condensing tray H-6 in greater detail. The tray is fed via downcomer 24 from tray H-5 above. The heat-transfer medium flows thereacross and down to tray H-7 via downcomer 26. Solvent vapors are fed to the condensing tray H-6 from evaporative tray E-9 immediately therebelow through apertures 28.

A preferred embodiment of my process is illustrated by reference to the following example read in conjunction with the accompanying drawings. Two million gallons per day of sea water (3.5% salinity) at a temperature of 85° F. is passed through liquid heat-transfer spray columns 4 and 5 and is introduced into condenser-evaporator tower 1 through line 2. The condenser-evaporator tower 1 is one hundred feet in height, forty-two feet in diameter and contains eleven evaporative and condensing trays. The sea water is introduced through sprayers 6 into the oil at a temperature of about 273° F. flowing across evaporative tray 11, and is thereafter upwardly passed as a suspension across the remaining evaporative trays. Oil is circulated through the tower 1 at a rate of $12.15 \times 10^6$ pounds per hour.

In Tables I and II below, there are tabulated the concentration of the sea water-oil suspension on the evaporative trays, as well as the temperature and pressure conditions on the evaporative and condensing trays.

TABLE I.—EVAPORATIVE TRAYS

| Tray No. | Vapor Pressure of Brine, p.s.i.g. | Oil Temp. Out, ° F. | Effluent Conc., Percent salt |
| --- | --- | --- | --- |
| E-1  | 15.0 | 218.4 | 7.0 |
| E-2  | 16.6 | 223.5 | 6.7 |
| E-3  | 18.3 | 228.6 | 6.35 |
| E-4  | 20.2 | 233.6 | 6.05 |
| E-5  | 22.2 | 238.7 | 5.7 |
| E-6  | 24.4 | 243.7 | 5.4 |
| E-7  | 26.7 | 248.7 | 5.1 |
| E-8  | 29.2 | 253.6 | 4.8 |
| E-9  | 31.8 | 258.6 | 4.45 |
| E-10 | 34.6 | 263.5 | 4.1 |
| E-11 | 37.8 | 268.5 | 3.8 |

TABLE II.—CONDENSING TRAYS

| Tray No. | Tray Pressure, p.s.i.g. | Oil Temp. Out, ° F. |
| --- | --- | --- |
| H-1  | 19.5 | 223.5 |
| H-2  | 21.5 | 228.5 |
| H-3  | 23.7 | 233.5 |
| H-4  | 26.0 | 238.5 |
| H-5  | 28.5 | 243.5 |
| H-6  | 31.1 | 248.4 |
| H-7  | 33.9 | 253.4 |
| H-8  | 37.1 | 258.3 |
| H-9  | 39.5 | 263.3 |
| H-10 | 42.8 | 268.4 |
| H-11 | 46.5 | 273.5 |

One million gallons per day of potable water is separated from the oil in phase separation zone 9 and is withdrawn from condenser-evaporator tower 1.

The scale problem is substantially eliminated in my process. At worst, scale may form sludge that can be filtered continuously or removed periodically.

The permissible temperature range is substantially increased, since scaling can be tolerated. In the present process, the temperature is limited only by vapor pressure, viscosity, and water solubility of heat-transfer medium. The range is quite broad, in the order of 150° F., or higher depending on the properties of the heat-transfer medium. Gilliland is, however, limited by the melting point of his fluid to paraffin and synthetic waxes having a melting point in the range of 140° to 200° F.

In my process, the need to transfer heat from condensing vapor to the fluid, then to the boiling liquid, in two steps each requiring a $\Delta T$, is more than compensated by the very large surface per unit of volume provided by droplets and vapor bubbles. Although the present process requires an additional temperature differential equal to the temperature swing (rise or fall) of the oil per tray, this is small because the process lends itself to the use of many stages or trays. High volumetric heat-transfer rates are possible since the heat-transfer medium used in the present process, such as oil or kerosene, is less viscous than the wax at its melting point.

Use of a heat-transfer fluid according to the present invention substitutes relatively inexpensive vessels for expensive heat-transfer surfaces, and thereby saves considerable equipment cost over conventional evaporative processes. The use of the tower, as herein disclosed, further reduces capital costs by permitting stacking the inevitably shallow layers of heat-transfer medium into a compact vessel. The use of an oil as compared to a wax saves a cost of fluid inventory, fluid circulation and size of circulating pumps, and size of phase separators. This process permits staging of the evaporative and condensing trays, so that the vapor from most of the evaporative trays feeds directly into condensing trays, thus reducing the quantity of vapor to be compressed. For the example, the quantity of vapor to be compressed is reduced by a factor of 11/3, and results in significant savings in the cost of compressors.

Since the use of a wax is limited to relatively few materials that are inert and insoluble in water and free from other objections (toxicity, odor, taste), it is difficult to achieve staging without compromising low ΔT's and other process features. With a liquid medium as used in the present process, a substantially wider temperature range may be employed permitting broader flexibility in the design of an optimum plant.

By practice of the present invention, lower capital and operating costs result for the following reasons:

(1) Vapor compression is characterized by low theoretical energy requirements.

(2) The use of a heat transfer fluid permits the development of very large heat transfer surface per unit volume in the form of droplets or bubbles with correspondingly higher volumetric heat transfer rates. Consequently, lower ΔT driving forces are possible which reduce theoretical energy requirement.

(3) The arrangement of stages whereby a major portion of the generated vapor passes directly into a condensing tray, permits reduction of energy loss due to pressure drops.

(4) The substitution of heat transfer fluid for metallic surface overcomes scaling problems, and permits operation in a wide temperature range, with a large number of stages. Because of the large number of stages and the relatively high pressure chosen at the top of the evaporator, the volume of vapor to be compressed is significantly reduced.

(5) The reduced volumetric compression requirements and the multiple staging result in substantially smaller compressors and vessels.

Limitations imposed upon the process of the present invention are few. Any concentration of feed, including sea water (3½% salts), may be used. Liquors that cause copious crystal formation or scaling may be handled by adding solids removal features.

The heat-transfer medium must be liquid, with low viscosity, high boiling point and low solubility in water. For potable water extraction, the liquid must also be free of toxicity, odor and taste. It is also preferred that the fluid be inexpensive and have a higher heat capacity. Many petroleum fractions satisfy these requirements.

Evaporation temperatures for water desalination can range from 120° F. to 400° F. and higher in theory. However, the tray spacing becomes objectionably close at low temperatures and objectionably great at very high temperatures. Also, it is preferred to operate at about atmospheric pressure at the top of the vessel. Hence, a temperature range of about 200° F. to 300° F. is more practical. The number of stages depends on the size of installation with large units employing more stages than smaller units. The temperature swing is related to the number of stages and the temperature range. The concentration ratio, i.e., the ratio of feed water to discarded brine of the present process depends on feed salinity, scaling components, feed water temperature, type of heat exchangers used, etc., and generally is within the range of 1.2 to 4.0.

While I have shown and described a preferred form of embodiment of my invention, I am aware that variations may be made thereto and I, therefore, desire a broad interpretation of my invention within the scope of the disclosure herein and the following claims.

I claim:

1. A method of separating a solute-solvent mixture comprising the steps of passing the mixture and a heated liquid medium substantially insoluble in the solvent in contacting relationship through a series of discrete zones in fluid communication therebetween of successively decreasing pressures and temperatures, vaporizing at least part of the solvent in each of said zones, simultaneously heating said medium by passing the same through a series of discrete zones in fluid communication therebetween of successively increasing pressures and temperatures, introducing a major portion of the vapors formed in said first mentioned series into said last mentioned zones and condensing the same therein to provide heat for said medium and collecting the condensed solvent.

2. A method of separating a solute-solvent mixture comprising the steps of passing the mixture and a heated liquid medium substantially insoluble in the solvent in concurrent contacting relationship through a first series of zones of successively decreasing pressures and temperatures, vaporizing at least part of the solvent in each of said zones, simultaneously heating said medium by passing the same through a second series of zones of successively increasing pressures and temperatures, introducing a major portion of the vapors formed in said first mentioned series into said last mentioned zones and condensing the same therein to provide heat for said medium, the vapors from some of the zones of the first-mentioned series being introduced into a respective zone of said last-mentioned series having a slightly lower pressure and temperature and collecting the condensed solvent.

3. A method of separating a solute-solvent mixture comprising the steps of passing the mixture and a heated liquid medium substantially insoluble in the solvent in concurrent contacting relationship through a first series of vertically spaced zones of successively decreasing pressures and temperatures, vaporizing at least part of the solvent in each of said zones, simultaneously heating said medium by passing the same through a second series of vertically spaced zones of successively increasing pressures and temperatures, introducing a major portion of the vapors formed in said first series into said second series of zones and condensing the same therein to provide heat for said medium, the vapors from some of the zones of the first series being introduced into the zones of said second series immediately thereabove, each zone of said second series having a slightly lower pressure and temperature than the zone of said first series immediately therebelow, and collecting the condensed solvent.

4. A method of separating a solute-solvent mixture as defined in claim 3, wherein the vapors from at least the uppermost zone of said first series are removed therefrom, compressed, and introduced into a lower zone of said second series.

5. A method of separating a solute-solvent mixture comprising the steps of passing the mixture and a heated liquid medium substantially insoluble in the solvent in concurrent contacting relationship through a first series of vertically spaced zones of successively decreasing pressures and temperatures, vaporizing at least part of the solvent in each of said zones, simultaneously heating said medium by passing the same through a second series of vertically spaced zones of successively increasing pressures and temperatures, heating said medium in said second series of zones by absorption of heat released by condensation of the vapors formed in said first series, and collecting the condensed solvent.

6. A method of separating a solute-solvent mixture comprising the steps of passing the mixture and a liquid heat-transfer medium substantially insoluble in the solvent in concurrent contacting relationship through a first series of vertically spaced zones of successively decreasing pressures and temperatures, vaporizing at least part of the solvent in each of said zones, simultaneously heating said heat-transfer medium by passing the same through a second series of vertically spaced zones of successively increasing pressures and temperatures, the zones of said first series being alternately and vertically arranged with respect to the zones of said second series, introducing a major portion of the vapors formed in said first series into said second series zones in direct contact with said heat-transfer medium and condensing the same therein to provide heat for said heat-transfer medium, the vapors from some of the zones of said first series being introduced into the respective zone of said second series immediately thereabove, each zone of said second series having a slightly lower pressure and temperature than the zone of said first series immediately therebelow, and collecting the condensed solvent.

7. A method of separating a solute-solvent mixture as defined in claim 6, wherein the vapors from at least the uppermost zone of said first series are removed therefrom, compressed, and introduced into a lower zone of said second series.

8. A method of separating a solvent-solute mixture comprising passing said mixture and a heat-transfer medium in concurrent heat-exchange relationship through a series of discrete zones in fluid communication therebetween of progressively decreasing temperatures and pressures, vaporizing at least part of the solvent in each of said zones, heating said heat-transfer medium by absorption of heat released by condensation of vapors formed in said series of zones, and collecting the condensed solvent.

9. A method of separating a solvent-solute mixture comprising passing said mixture and a heat-transfer medium in concurrent heat-exchange relationship through a series of discrete zones in fluid communication therebetween of progressively decreasing temperatures and pressures, vaporizing at least part of the solvent in each of said zones, introducing a major portion of the vapors formed in said series of zones directly into said heat-transfer medium, heating said heat-transfer medium by absorption of heat released by condensation of said vapors therein, and collecting the condensed solvent.

10. A method of separating a solute-solvent mixture comprising the steps of passing the mixture and a liquid heat-transfer medium substantially insoluble in the solvent in contacting relationship through a first series of vertically spaced zones of successively decreasing pressures and temperatures, vaporizing at least part of the solvent in each of said zones, removing solute concentrate from the upper zone of said first series, simultaneously heating said heat-transfer medium by passing the same through a second series of vertically spaced zones of successively increasing pressures and temperatures, a portion of the zones of said first series being alternately and vertically arranged with respect to zones of said second series, introducing a major portion of the vapors formed in said first series into said second series of zones and condensing the same therein to provide heat for said heat-transfer medium, the vapors from some of said zones of the first series being introduced into the respective zones of said second series immediately thereabove, each zone of said second series having a slightly lower pressure and temperature than the zone of said first series immediately therebelow, and collecting the condensed solvent in the lower zone of said second series.

11. A method of separating a solute-solvent mixture as defined in claim 10, wherein the heat-transfer medium is circulated through said first and second series, and wherein the mixture is introduced into the zone of said first series immediately above a zone of said second series wherein said condensed solvent is collected.

12. A method of separating a solute-solvent mixture as defined in claim 10, wherein the vapors from at least the uppermost zone of said first series are removed therefrom, compressed, and introduced into a lower zone of said second series.

13. A method of separating a solute-solvent mixture as defined in claim 12, wherein said collected solvent and solute concentrate are used to preheat said mixture.

14. Apparatus for separating a solute-solvent mixture comprising a vertical substantially cylindrical tower, means dividing said tower into a series of evaporative trays and a series of condensing trays, the individual evaporative and condensing trays being alternately arranged in said tower, means interconnecting said evaporative trays, means interconnecting said condensing trays, said series of evaporative trays and said series of condensing trays being interconnected at the top and bottom of said tower, means for introducing said mixture onto an evaporative tray adjacent the bottom of said tower, means for introducing the vapors formed on the evaporative trays into the heat-transfer medium on the condensing tray immediately thereabove whereby said vapors are condensed and said heat-transfer medium heated, means for collecting said condensed vapors, and means for collecting concentrated solute.

15. Apparatus for separating a solute-solvent mixture comprising a vertical substantially cylindrical tower, means dividing said tower into a series of evaporative trays and a series of condensing trays, the individual evaporative and condensing trays being alternately arranged in said tower, means interconnecting said evaporative trays including upcomer means arranged adjacent the wall of said tower, means interconnecting said condensing trays including down-comer means circumferentially spaced from said first-mentioned upcomer means and adjacent the wall of said tower, said series of evaporative trays and said series of condensing trays being interconnected at the top and bottom of said tower, means for introducing said mixture onto an evaporative tray adjacent the bottom of said tower, means for introducing the vapors formed on the evaporative trays into the heat-transfer medium on the condensing tray immediately thereabove whereby said vapors are condensed and said heat-transfer medium heated, means for collecting said condensed vapors, and means for collecting concentrated solute.

16. A method of demineralizing brackish water which comprises passing said brackish water in admixture with a liquid heat-transfer medium substantially insoluble in the water in contacting relationship through a first series of vertically spaced zones of successively decreasing pressures and temperatures, vaporizing at least part of the water in each of said zones, removing concentrate brine from the upper zone of said first series, simultaneously heating said heat-transfer medium by passing the same through a second series of vertically spaced zones of successively increasing pressures and temperatures, a portion of the zones of said first series being alternately and vertically arranged with respect to zones of said second series, introducing a major portion of the water vapor formed in said first series into said second series of zones and condensing the same therein to provide heat for said heat-transfer medium the water vapor from some of said zones of the first series being introduced into the respective zones of said second series immediately thereabove, each zone of said second series having a slightly lower pressure and temperature than the zone of said first series immediately therebelow, and withdrawing condensed water from said second series of zones.

17. The method defined in claim 16 wherein the water vapor from at least the uppermost zone of said first series is removed therefrom, compressed and introduced into a lower zone of said second series.

18. The method defined in claim 16 wherein the heat-transfer medium is circulated through said first and second series, and wherein the mixture is introduced into the zone of said first series immediately above a zone of said second series wherein condensed water is collected.

(References on following page)

References Cited by the Examiner

UNITED STATES PATENTS

| | | | |
|---|---|---|---|
| 1,547,893 | 7/1925 | Bergius | 202—74 |
| 2,151,990 | 3/1939 | Ruys | 202—74 |
| 2,315,422 | 3/1943 | Hildebrandt | 202—74 |
| 2,749,094 | 6/1956 | Lewis et al. | 202—158 |
| 2,759,882 | 8/1956 | Worthen et al. | |
| 2,878,167 | 3/1959 | Alheritiere | 202—40 |
| 2,894,879 | 7/1959 | Hickman | 202—174 |
| 2,976,224 | 3/1961 | Gilliland et al. | 202—75 |
| 3,032,482 | 5/1962 | Shoemaker | 202—74 |
| 3,151,042 | 9/1964 | Koshoot | 202—158 |
| 3,236,747 | 2/1966 | Margiloff | 203—11 |

NORMAN YUDKOFF, *Primary Examiner.*

GEORGE D. MITCHELL, *Examiner.*

J. B. DONIHEE, W. L. BASCOMB, *Assistant Examiners.*